United States Patent
Park et al.

(10) Patent No.: US 10,070,317 B2
(45) Date of Patent: Sep. 4, 2018

(54) METHOD AND APPARATUS OF NOTIFYING OF SMISHING

(71) Applicant: Samsung Electronics Co., Ltd., Suwon-si (KR)

(72) Inventors: Heyyoung Park, Seoul (KR); Jaehyun Park, Seongnam-si (KR); Jaeyoung Shin, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 52 days.

(21) Appl. No.: 14/738,237

(22) Filed: Jun. 12, 2015

(65) Prior Publication Data

US 2016/0007204 A1    Jan. 7, 2016

(30) Foreign Application Priority Data

Jul. 1, 2014 (KR) .......... 10-2014-0081661

(51) Int. Cl.
| | |
|---|---|
| *H04W 12/12* | (2009.01) |
| *H04L 29/06* | (2006.01) |
| *G06F 17/30* | (2006.01) |
| *H04W 4/14* | (2009.01) |

(52) U.S. Cl.
CPC ...... *H04W 12/12* (2013.01); *G06F 17/30887* (2013.01); *H04L 63/126* (2013.01); *H04L 63/1408* (2013.01); *H04L 63/1483* (2013.01); *H04W 4/14* (2013.01)

(58) Field of Classification Search
CPC .......... H04W 12/12; H04L 63/1483
See application file for complete search history.

(56) References Cited

U.S. PATENT DOCUMENTS

| | | | |
|---|---|---|---|
| 2005/0289148 A1 | 12/2005 | Dorner et al. | |
| 2006/0101120 A1* | 5/2006 | Helsper | G06Q 10/109 709/206 |
| 2010/0255811 A1 | 10/2010 | Jover Aparicio | |
| 2012/0150989 A1* | 6/2012 | Portnoy | G06F 17/30876 709/217 |
| 2012/0151578 A1* | 6/2012 | Niemela | H04L 12/585 726/22 |

(Continued)

FOREIGN PATENT DOCUMENTS

| | | |
|---|---|---|
| JP | 2013 130980 | 7/2013 |
| KR | 10 2013 0080831 A | 7/2013 |

(Continued)

OTHER PUBLICATIONS

International Search Report dated Sep. 23, 2015 in connection with International Patent Application No. PCT/KR2015/005802, 3 pages.

*Primary Examiner* — David J Pearson

(57) ABSTRACT

A method and apparatus of notifying of SMiShing-related information is provided. The method of notifying of SMiShing by an electronic device includes: transmitting at least one item of message-related information about a received message to a SMiShing detection server; receiving SMiShing-related information about the message from the SMiShing detection server; and displaying content of the message and the received SMiShing-related information when a request is made to display the message.

11 Claims, 10 Drawing Sheets

(56) References Cited

U.S. PATENT DOCUMENTS

| | | | | |
|---|---|---|---|---|
| 2012/0324568 A1* | 12/2012 | Wyatt | ............... | G06F 21/51 |
| | | | | 726/13 |
| 2014/0128047 A1* | 5/2014 | Edwards | ............ | H04L 51/12 |
| | | | | 455/415 |
| 2014/0259158 A1* | 9/2014 | Brown | ............... | G06F 21/554 |
| | | | | 726/22 |
| 2016/0021534 A1* | 1/2016 | Hong | ............... | H04W 12/12 |
| | | | | 455/411 |
| 2016/0330239 A1* | 11/2016 | Han | ............... | H04W 12/12 |

FOREIGN PATENT DOCUMENTS

| KR | 20130080831 A | 7/2013 |
|---|---|---|
| KR | 101321721 B1 | 10/2013 |

* cited by examiner

METHOD AND APPARATUS OF NOTIFYING OF SMISHING

CROSS-REFERENCE TO RELATED APPLICATION(S) AND CLAIM OF PRIORITY

The present application is related to and claims the benefit under 35 U.S.C. § 119(a) of a Korean patent application filed on Jul. 1, 2014, in the Korean Intellectual Property Office and assigned Serial No. 10-2014-0081661, the entire disclosure of which is hereby incorporated by reference.

TECHNICAL FIELD

Various embodiments of the present disclosure relate to a method and apparatus of providing SMiShing-related information to an electronic device to detect various types of SMiShing (which is short for SMS phishing and means a text message fraud).

BACKGROUND

With the development of information and communication technology, the applications of text messages have also increased quickly. Examples of text messages are short message service (SMS) messages, multimedia message service (MMS) messages, instant messenger (IM) messages, etc. Text messages may be written including links to websites or links to download files.

SUMMARY

As the number of times of using a text messaging function increases in information transmission, damage by malicious text messages also increases. More particularly, damage by SMiShing increases that asks recipients to click a link in the received text message or to call back an originator's phone number, thereby downloading malicious software, revealing personal information, small-amount payment, etc.

To address the above-discussed deficiencies, it is a primary object to provide a method and apparatus of notifying of SMiShing that shows the user thumbnail information about a link in the received text message before opening (performing) the link or provides the user with a SMiShing history matching the originator's information. This allows the user to recognize the risk of SMiShing based on the information, thereby reducing the SMiShing damage.

In accordance with various embodiments of the present disclosure, the present disclosure provides a method of notifying of SMiShing by an electronic device including: transmitting at least one item of message-related information about a received message to a SMiShing detection server; receiving SMiShing-related information about the message from the SMiShing detection server; and displaying content of the message and the received, SMiShing-related information when a request is made to display the message.

In accordance with various embodiments of the present disclosure, the present disclosure provides a method of notifying of SMiShing by a SMiShing detection server including: receiving at least one item of message-related information from an electronic device; determining type of the received, message-related information; collecting SMiShing-related information notifying of whether a corresponding message is related to SMiShing, based on the determined, type of message-related information; and transmitting the collected, SMiShing-related information to the electronic device.

In accordance with various embodiments of the present disclosure, the present disclosure provides a method of notifying of SMiShing including: transmitting at least one item of message-related information from an electronic device to a SMiShing detection server; determining type of the received, message-related information by the SMiShing detection server; collecting, by the SMiShing detection server, SMiShing-related information about the message, based on the determined, type of message-related information; and transmitting the collected, SMiShing-related information from the SMiShing detection server to the electronic device; and displaying, by the electronic device, content of the message and the received, SMiShing-related information when a request is made to display the message.

In accordance with various embodiments of the present disclosure, the present disclosure provides an electronic device for notifying of SMiShing including: a communication unit for: receiving a message; transmitting message-related information to a SMiShing detection server; and receiving SMiShing-related information from the SMiShing detection server; a display; and a controller for: determining type of the message-related information to be transmitted to the SMiShing detection server; and controlling the display to display content of the message and the received, SMiShing-related information when a request is made to display the message.

In accordance with various embodiments of the present disclosure, the present disclosure provides a SMiShing detection server including: a SMiShing information database; a SMiShing information collecting module for collecting SMiShing-related information notifying of whether a corresponding message is related to SMiShing, based on message-related information; and a communication unit for receiving the message-related information from an electronic device and the SMiShing-related information to the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
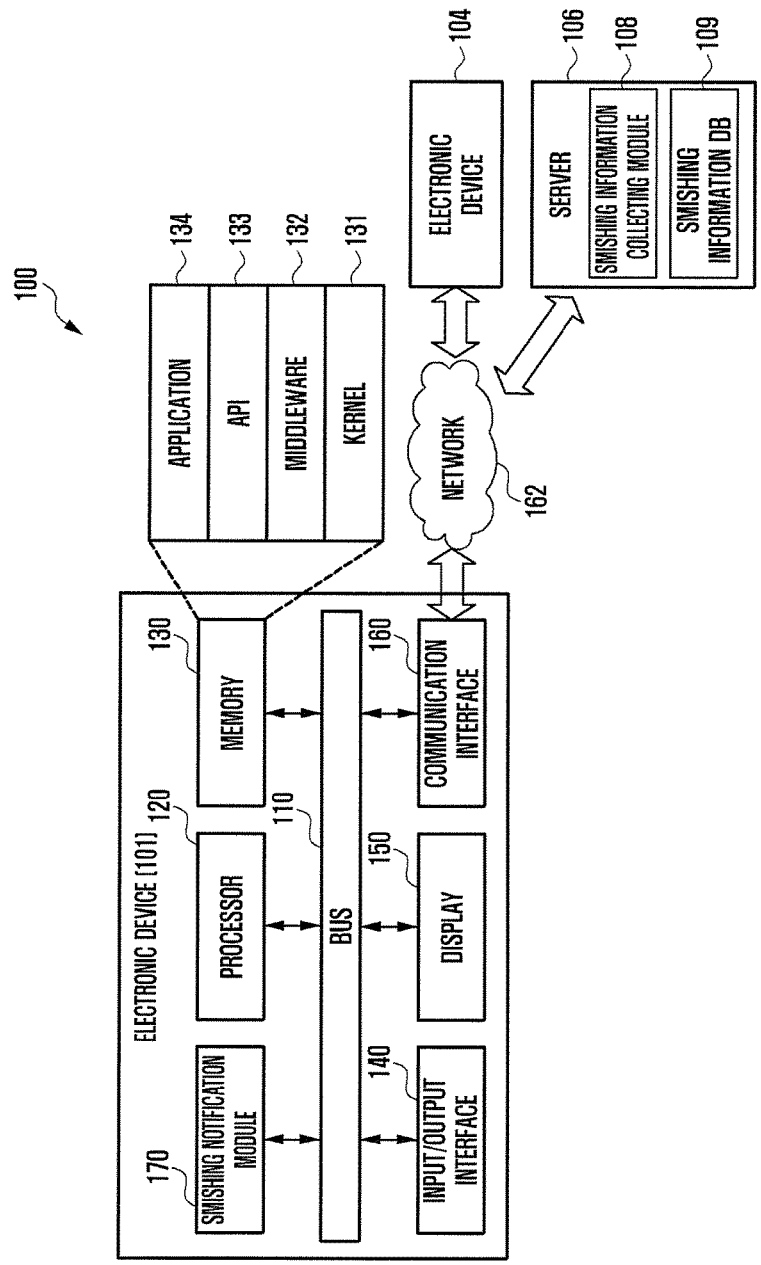
FIG. 1 illustrates a network environment including an electronic device according to various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Exemplary embodiments of the present disclosure are described with reference to the accompanying drawings in detail. Various changes may be made to the disclosure, and the disclosure may have various forms, such that exemplary embodiments will be illustrated in the drawings and described in detail. However, such various embodiments is not intended to limit the disclosure to the disclosed exemplary embodiment and it should be understood that the embodiment include all changes, equivalents, and substitutes within the spirit and scope of the disclosure. Throughout the drawings, like reference numerals refer to like components.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify the presence of stated feature, number, step, operation, component, element, or a combination thereof but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components but not restrict the corresponding components. However, it is obvious that the components should not be defined by these terms. The terms are used only for distinguishing one component from another component. For example, a first component is referred to as a second component and likewise, a second component also be referred to as a first component, without departing from the teaching of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

The terminology used herein is for the purpose of describing particular embodiments only and is not intended to be limiting of the disclosure. As used herein, the singular forms are intended to include the plural forms as well, unless the context clearly indicates otherwise.

Unless otherwise defined, all terms used herein have the same meaning as commonly understood by one of ordinary skill in the art to which this disclosure pertains, and should be interpreted neither as having an excessively comprehensive meaning nor as having an excessively contracted meaning. The general terms used herein should be interpreted according to the definitions in the dictionary or in the context and should not be interpreted as an excessively contracted meaning.

In the following description, the electronic device is a device having a communication function. Examples of the electronic device includes at least one of a smartphone, a tablet PC, a mobile phone, a video phone, an electronic book (ebook) reader, a desktop PC, a laptop PC, a netbook PC, a Personal Digital Assistant (PDA), a Portable Multimedia Player (PMP), an MP3 player, a mobile medical appliance, a camera, a wearable device (e.g. head-mounted-device (HMD) such as electronic glasses), an electronic clothing, an electronic bracelet, an electronic neckless, an appcessory, an electronic tattoo, and a smart watch.

According to certain embodiments, an example of the electronic device is a smart home appliance having a communication function. Examples of the smart home appliance includes at least one of a television, a Digital Video Disk (DVD) player, an audio player, a refrigerator, an air conditioner, a cleaner, an oven, a microwave oven, a laundry machine, an air cleaner, a set-top box, a TV box (e.g. SAMSUNG HOMESYNC™, APPLE TV™, and GOOGLE TV™), a game console, an electronic dictionary, an electronic key, a camcorder, and an electronic frame.

According to certain embodiments, examples of the electronic device includes at least one of a medical appliance (e.g. Magnetic Resonance Angiography (MRA), Magnetic Resonance Imaging (MRI), Computed Tomography (CT), camera, and ultrasonic device), a navigation device, a Global Positioning System (GPS) receiver, an Event Data Recorder (EDR), a Flight Data Recorder (FDR), a car infotainment device, an electronic equipment for ship (e.g. marine navigation device and gyro compass), avionics device, security device, a Head Up Display (HUD), an industrial or home robot, an Automatic Teller Machine (ATM) of a financial institution, and a Point Of Sales (POS).

According to certain embodiments, examples of the electronic device includes furniture or part of building/construction which has a communication function, an electronic board, an electronic signature receiving device, a projector, and a metering device (e.g. water, electricity, and electric wave metering devices). According to various embodiments, the electronic device is one or any combination of the above enumerated devices. According to various embodiments, the electronic device is a flexible device. However, it is obvious to those in the art that the electronic device of the present disclosure is not limited to the above devices.

A description is made of the electronic device according to various embodiments with reference to accompanying drawings hereinafter. In the description of the various embodiments, the term 'user' denotes a person or a device (e.g. intelligent electronic device) that uses the electronic device.

FIG. 1 is a diagram illustrating the network architecture including the electronic device according to various embodiments of the present disclosure.

Referring to FIG. 1, the electronic device 101 includes a bus 110, a processor 120, a memory 130, an input/output interface 140, a display 150, a communication interface 160, and a SMishing notification module 170.

The bus 110 is a circuitry which connects the aforementioned components to each other to communicate signals (e.g. control messages) therebetween.

The processor 120 receives a command from any of the aforementioned components (e.g. memory 130, input/output interface 140, display 150, communication interface 160, and SMishing notification module 170) through the bus 110, interprets the command, and executes operation or data processing according to the decrypted command.

The memory 130 stores the command or data received from the processor 120 or other components (e.g. input/output interface 140, display 150, communication interface 160, SMishing notification module 170, etc.) or generated by the processor 120 or other components. The memory 130 stores program modules including kernel 131, middleware 132, Application Programming Interface (API) 133, applications 134, etc. Each programming module is implemented as software, firmware, hardware, and any combination thereof.

The kernel 131 controls or manages the system resources (e.g. bus 110, processor 120, and memory 130) for use in executing the operation or function implemented with the middleware 132, the API 133, or the application 134. The kernel 131 also provides an interface allowing the middleware 132, API 133, or application 134 to access the components of the electronic device 101 to control or manage.

The middleware 132 works as a relay of data communicated between the API 133 or application 134 and the kernel 131. The middle 132 executes control of the task requests from the applications 134 in such a way of assigning priority for use of the system resource (e.g. bus 110, processor 120, and memory 130) of the electronic device to at least one of the applications 134.

The API 133 is the interface for the applications 134 to control the function provided by the kernel 131 or the middleware 132 and includes at least one interface or function (e.g. command) for file control, window control, image control, or text control.

According to various embodiments, the applications 134 includes Short Messaging Service/Multimedia Messaging Service (SMS/MMS) application, email application, calendar application, alarm application, health care application (e.g. application of measuring quantity of motion or blood sugar level), and environmental information application (e.g. atmospheric pressure, humidity, and temperature applications). The application 134 is an application related to information exchange between the electronic device 101 and other external electronic device (e.g. electronic device 104). Examples of the information exchange application includes a notification relay application for relaying specific information to the external electronic device 104 and a device management application for managing the external electronic device.

For example, the notification relay application is provided with a function of relaying the alarm information generated by the other applications (e.g. SMS/MMS application, email application, health care application, and environmental information application) of the electronic device to an external electronic device (e.g. electronic device 104). The notification relay application provides the user with the notification information received from an external electronic device (e.g. electronic device 104). The electronic device application manages (e.g. install, delete, and update) the function of an external electronic device (e.g. turn-on/off of the electronic device 104 itself (or a part of it) or adjustment of the brightness (or resolution) of the display) which communicates with the electronic device 101 or the service (e.g. communication or messaging service) provided by the external electronic device or an application running on the external device.

According to various embodiments, the applications 134 includes an application designated according to the property (e.g. type) of an external electronic device (electronic device 104). When the external electronic device is the MP3 player, the applications 134 includes a music playback application. When the external electronic device is a mobile medical appliance, the applications 134 includes a heal care application. According to various embodiments, the application 134 includes at least one of applications designated to the electronic device 101 or the applications received from the external electronic device (e.g. server 106 and electronic device 104).

The input/output interface 140 delivers the command or data input by the user through with an input/output device (e.g. sensor, keyboard, and touchscreen) to the processor 120, memory 130, communication interface 160, and/or SMishing notification module 170 through the bus 110. For example, the input/output interface 140 provides the processor 120 with the data corresponding to the touch by the user on the touchscreen. The input/output interface 140 outputs the command or data (which is received from the processor 120, memory 130, communication interfaced 160, or the SMishing notification module 170 through the bus 110) through the input/output device (e.g. speaker and display). For example, the input/out interface 140 outputs the voice data processed by the processor 120 to the user through the speaker.

The display 150 presents various informations (e.g. multimedia data and text data) to the user.

The communication interface 160 establishes a communication connection of the electronic device 101 with an external device (e.g. electronic device 104 and server 106). For example, the communication interface 160 connects to the network 162 through a wireless or wired link for communication with the external device. Examples of the wireless communication technology includes wireless fidelity (Wi-Fi), BLUETOOTH (BT), Near Field Communication (NFC), Global Positioning System (GPS), and cellular communication technology (e.g. Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology include Universal Serial Bus (USB), High Definition Multimedia Interface (HDMI), Recommended Standard 232 (RS-232), and Plain Old Telephone Service (POTS).

According to various embodiments, the network 162 is a telecommunication network. The communication network includes at least one of computer network, Internet, Internet of Things, and telephone network. According to various embodiments, the communication protocol between the electronic device 101 and an external device (e.g. transport layer protocol, data link layer protocol, and physical layer protocol) is supported by at least one of the applications 134, API 133, middleware 132, kernel 131, and communication interface 160.

The SMishing notification module 170 processes at least part of the text information acquired from other components (e.g. the processor 120, the memory 130, the input/output interface 140, and the communication interface 160) and provides the user with the processing result. For example, the SMishing notification module 170 controls at least part of the functions of the electronic device 101 to interoperate with other electronic device (e.g. the electronic device 104 and the server 106) with or without using of the processor 120. A description is made of the SMishing notification module 170 in more detail hereinafter with reference to FIG. 2.

According to various embodiments, the server 106 extracts text messages transmitted to the electronic device 101 or SMiShing-related information about text messages to be transmitted to the electronic device 101. The server 106 performs at least one of the functions (or operations) that are implemented on the electronic device 101, thereby supporting the operation of the electronic device 101. For example, the server 106 includes a SMiShing information collecting module 108 for supporting a SMiShing notification module 170 of the electronic device 101 and a SMiShing information DB 109. For example, the SMiShing information collecting module 108 includes at least one of the components of the SMiShing notification module 170 and performs at least one of the functions performed by the SMiShing notification module 170 (or executes at least one of the functions of the SMiShing notification module 170 for the SMiShing notification module 170). The SMiShing information DB 109 includes originating phone numbers and originators, reported as SMiShing, with the number of times of being reported as SMiShing. The SMiShing information DB 109 stores information about malicious URLs that have frequently made an access attempt. The SMiShing information DB 109 also stores original website addresses of organizations or companies that fraudsters have frequently used for fraud, e.g., parcel-tracking homepages of delivery companies, homepages of financial organizations, homepages of communication-service companies, etc. The SMiShing information DB 109 collects data based on users' SMiShing reports, etc. The SMiShing information DB 109 provides information to determine whether links or phone numbers contained in a text message is legitimate or fake.

The server 106 is implemented in such a way as to detect SMiShing-related information using part of information (e.g., links, originating phone numbers, etc.) required for detecting SMiShing from received text messages. The server 106 can also be implemented as an instant messenger (IM) server and cellular message server for managing transmission of cellular messages such as SMS messages. These servers that transmit messages detect SMiShing-related information using information about messages (e.g., originator's information) before transmitting the messages to the electronic device and transmit the messages along with the detected SMiShing-related information to the electronic device.

The SMiShing notification module 170 processes at least part of the information obtained from the other components (e.g., the processor 120, memory 130, input/output interface 140, communication interface 160, etc.) and provides the processed information to the user in various modes. For example, with the processor 120 or separately from the processor 120, the SMiShing notification module 170 controls at least part of the functions of the electronic device 101 so that the electronic device 101 cooperates with other electronic device (e.g., electronic device 104 or the server 106). According to various embodiments, at least one of the components of the SMiShing notification module 170 is included in the server 106 (e.g., SMiShing information collecting module 108). In certain embodiments, at least one of the functions implemented on the SMiShing notification module 170 is supported by the server 106. Although it is not shown in the drawing, the server 106 includes a communication interface for making a communication with the electronic device 101.

Figure 2:
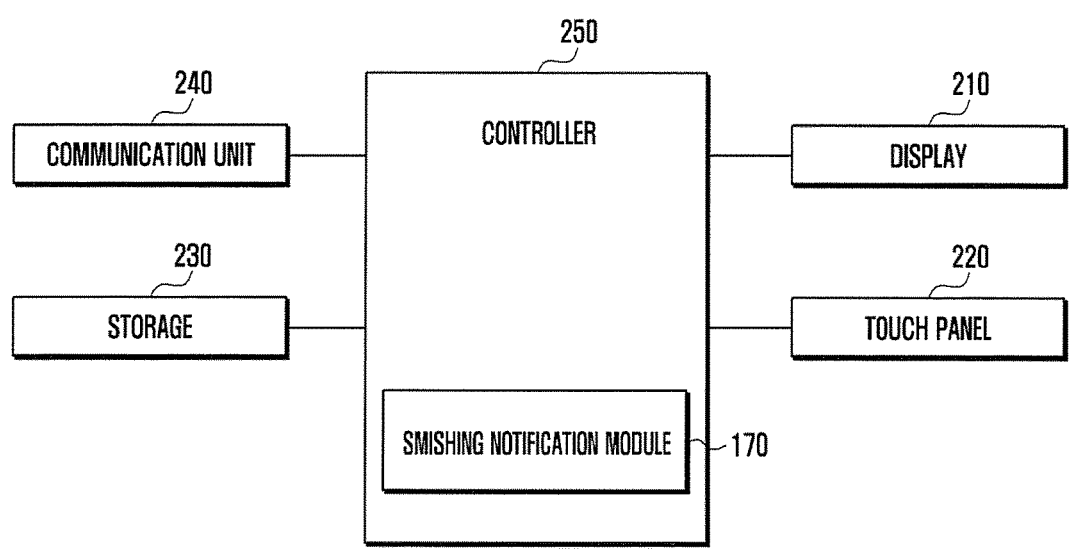
FIG. 2 illustrates a schematic block diagram of an electronic device according to various embodiments of the present disclosure.

FIG. 2 illustrates a schematic block diagram of an electronic device according to various embodiments.

Referring to FIG. 2, the electronic device includes a display 210, a touch panel 220, a storage 230, a communication unit 240, and controller 250. The controller 250 includes a SMiShing notification module 170.

The display 210 displays applications running on the electronic device, menu screens, etc. The display 210 displays a screen notifying of reception of messages (e.g., cellular messages, IM messages, etc.). The display 210 also displays information about received messages (e.g., message content, message senders, etc.). When the display 210 displays content of a received message according to a user's request, it also displays SMiShing-related information about the received message, detected by a server, as well as the received message, on the screen.

The touch panel 220 detects a user's touch events. The touch panel 220 detects touch events according to a request for displaying messages and a request for setting a function to display messages (e.g., limitation of displaying messages before receiving SMiShing-related information, notification of SMiShing before displaying a message when it is suspicious-looking message like SMiShing message, etc.).

The storage 230 stores commands and programs related to the operations of the electronic device. According to various embodiments of the present disclosure, the storage 230 stores information about a preset message display function. For example, when a request is made to display messages, the storage 230 stores information about a function to limit displaying corresponding received messages when the received messages contain SMiShing-related information. According to various embodiments of the present disclosure, the storage 230 also stores a program that downloads, when a received message contains an item that has been preset (e.g., a web address), information about the item from a server, displays the item information and the received message, and performs other functions related to the displaying operation.

The communication unit 240 makes a communication between the electronic device and other electronic device and between the electronic device and the server in wireless or wired mode. According to various embodiments of the present disclosure, the communication unit 240 receives Short Message Service (SMS) message and Instant Messenger (IM) messages. When servers of communication service companies for managing SMS messages or IM servers for managing IM messages detect SMiShing attacks, the communication unit 240 receives SMiShing-related information detected by the SMiShing detection servers, along with corresponding messages. According to another embodiment of the present disclosure, when a server detects (extracts) SMiShing-related information based on message-related information, the communication unit 240 receives the message and requests the SMiShing-related information about the received message from the server. The communication unit 240 receives the SMiShing-related information about the received message from the server.

The controller 250 controls the entire operation of the electronic device. The controller 250 is configured the same as the processor 120 shown in FIG. 1. The controller 250 obtains message-related information from messages, such as text messages, IM messages, etc., which are transmitted from external devices (e.g., electronic device 104) through various types of communication methods (e.g., cellular network communication). The message-related information includes an originator's phone number, a subject line and content of a text message, ID of an IM message, etc. In order to receive SMiShing-related information about a received message, the controller 250 controls the communication unit 240 to transmit part of the message-related information obtained from the received message to an external server (e.g., server 106).

The controller 250 receives SMiShing-related information from, for example, an external server (e.g., server 106). According to various embodiments, the controller 250 receives, from an external sever (server 106), the full URL of a short URL contained in a message, thumbnail information about a link obtained based on the full URL, etc. The controller 250 also receives information about a SMiShing history of a message originator from an external server through the communication unit 240.

The controller 250 controls the display 210 to display messages according to a message display request. The controller 250 includes a SMiShing notification module 170. When a message display request is made, the SMiShing notification module 170 performs a control operation to display the received SMiShing-related information along with the corresponding message. For example, when the electronic device receives a text message containing a short link, the SMiShing notification module 170 displays the received text message and a thumbnail of the short link on the message display window. The thumbnail is an image created by capturing a screen displayed when the link is selected in the text message. When the received, SMiShing-related information contains information about a SMiShing history, the SMiShing notification module 170 performs a control operation to display the received message and the SMiShing history of the originator who sent the message on the message display window.

Figure 3:
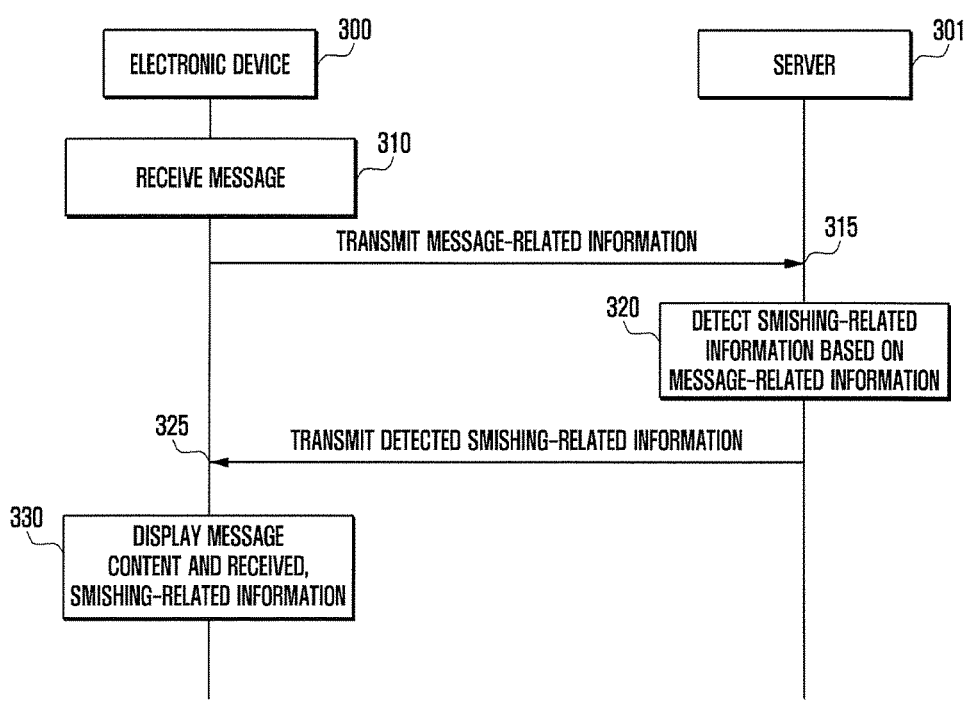
FIG. 3 illustrates a method of networking in an electronic device to display SMiShing-related information, according to various embodiments of the present disclosure of the present disclosure.

FIG. 3 is a flow chart that describes a method of networking in an electronic device to display SMiShing-related information, according to various embodiments of the present disclosure.

The electronic device 300 receives text messages from an external device (310). For example, the text message includes IM messages, cellular messages, such as SMS messages and MMS messages, etc. The electronic device 300 transmits message-related information about the received, text message to the server 301 (315). The message-related information includes an originator's information (e.g., an originator's phone number, messenger ID, etc.), a message subject (if it is an MMS message), a message body, links contained in a message, etc. According to various embodiments, the electronic device 300 provides the server 301 with only part of the message-related information that the server 301 needs to detect SMiShing-related information. The server 301 detects SMiShing-related information, based on the message-related information transmitted from the electronic device 300 (320). When the server 301 receives the message-related information containing a short link, it restores a full URL from the short link and collects thumbnail information about a link, obtained from the restored full URL, from the SMiShing information collecting module 108. The thumbnail information about the link is an image of a screen displayed when the link is selected. When the user selects the link, he or she may have damages, such as infection by malicious code, downloading malicious apps, revealing the personal information, etc. When the link, e.g., fraudulent link, is selected in the text message, the electronic device displays a downloading screen or a screen without regard to the text message body. The thumbnail is information about an image capturing a screen in a preset size which shows a predicted risk (damage) if the user has selected the link, without selecting the link. When the server 301 ascertains that the message-related information transmitted from the electronic device 300 contains an originator's information, it collects a SMiShing history of the originator's information. Examples of the originator's information are an originator's IM ID, phone number, etc. The SMiShing history is information stored in the SMiShing information DB 109. As described above, the server 301 detects SMiShing-related information used for the determination as to whether a message is a SMiShing message based on the message-related information transmitted from the electronic device 300. The server 301 re-transmits the detected SMiShing-related information to the electronic device 300 (325). The electronic device 300 display the text message along with the received, SMiShing-related information transmitted from the server 301, according to a message display request (330).

Although it is not shown in FIG. 3, the server 301 is a message transmitting server, such as a server for managing transmission of cellular messages or an IM server. When the server 301 is implemented with a message transmitting server, the electronic device 300 receives, when receiving a text message from the server 301, the SMiShing-related information detected by the server 301 as well. For example, when the server 301 has a message to be transmitted to the electronic device 300, it collects the SMiShing-related information based on the message-related information, such as the originator's information about the message, etc. The server 301 extracts SMiShing-related information, such as a SMiShing history of the originator's phone number, from the SMiShing information DB 109. After the electronic device 300 receives the text message and the SMiShing-related information about the text message from the server 301, it displays the text message along with the SMiShing-related information on the screen. For example, the electronic device 300 displays a SMiShing history of an originator of the message on one side of the screen displaying the message content.

In the following description, operations performed in the electronic device and the server are explained in detail referring to FIGS. 4 and 5.

Figure 4:
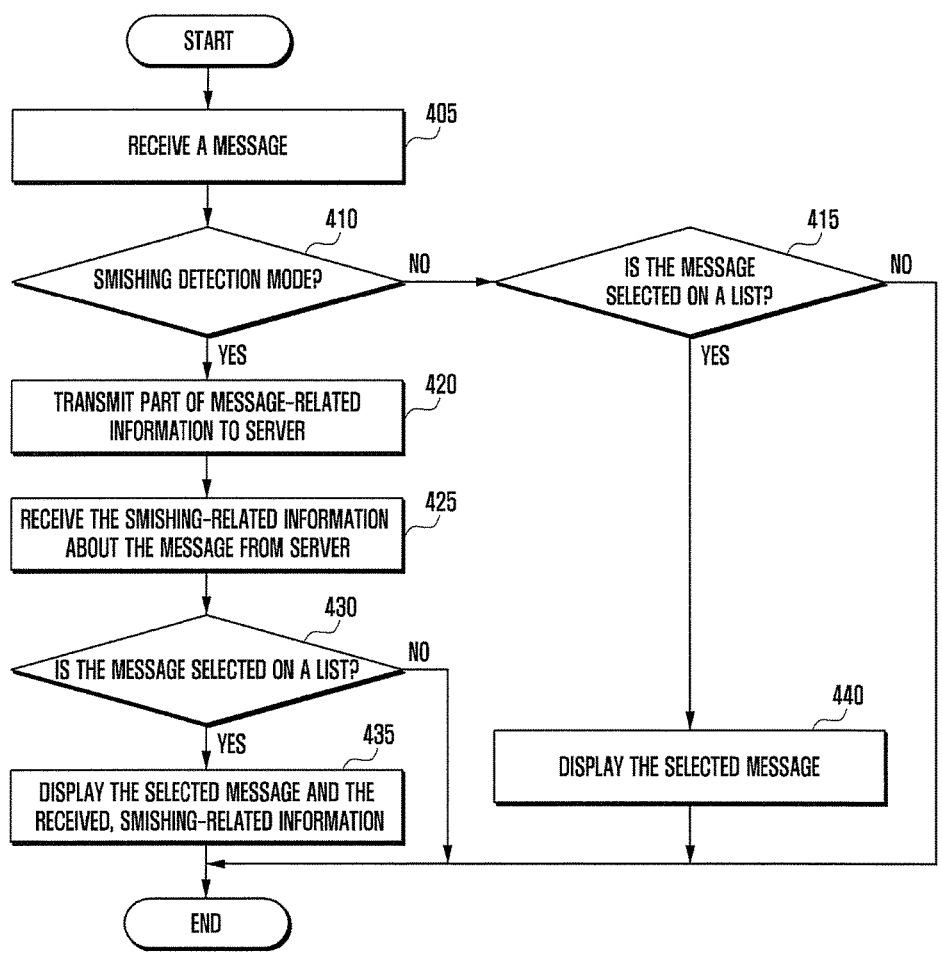
FIG. 4 illustrates a method of notifying of SMiShing in an electronic device according to various embodiments of the present disclosure.

FIG. 4 is a flow chart that describes a method of notifying of SMiShing in an electronic device according to various embodiments of the present disclosure.

Referring to FIG. 4, the electronic device receives messages through the communication unit 240 (405). Examples of the messages are SMS messages, MMS messages, IM messages, etc. The messages contain text, images, music file, video, links, etc. The controller 250 of the electronic device determines whether a SMiShing detection mode is enabled (410). The SMiShing detection mode according to various embodiments of the present disclosure is enabled or disenabled according to a user's selection. In another embodiment, it is implemented without determining whether a SMiShing detection mode is enabled. In certain embodiments, the controller 250 performs operation 420 after operation 405.

When the controller 250 ascertains that a SMiShing detection mode is not enabled in operation 410, it determines whether the message on a list is selected to display the content (415). When the controller 250 ascertains that the message on a list is not selected in operation 415, it terminates the procedure. When the controller 250 ascertains that the message on a list is selected in operation 415, it displays only the selected message (440).

When the controller 250 ascertains that a SMiShing detection mode is enabled in operation 410, it controls the SMiShing notification module 170 to transmit part of the message-related information to the server for detecting SMiShing (420). The message-related info ration includes, for example, a message subject, message content, a message originator's information, etc. The controller 250 transmits part of the message-related information (e.g., items that the server is likely to use to extract SMiShing-related information) to the server. For example, when the controller 250 has received a message containing a link from an unknown originator, it controls the SMiShing to select only link information and to transmit it to the server.

In the foregoing description, the embodiments are described in such a way that the controller 250 transmits the received messages along with the message-related information about the received messages to the server. According to various embodiments, the controller 250 extracts message-related information about specific messages and transmits the extracted message-related information to the server. For example, when the electronic device receives a message, the controller 250 determines whether the received message corresponds to a target for SMiShing detection. When the controller 250 ascertains that the received message corresponds to a target for SMiShing detection, it performs operations after operation 420 only for the received message. For example, when the electronic device receives a message that does not contain a link but has stored the originator's information about the received in the contact, the controller 250 excludes the message from a target for SMiShing detection. When the electronic device receives a message that is transmitted through an unregistered phone number but contains a link, the controller 250 extracts the message-related information and transmits the extracted message-related information to the server. It should be understood that the present disclosure also includes various standards for extracting text messages corresponding to targets for SMiShing detection. It should be understood that the standards for determining targets for SMiShing detection are altered by a user's settings.

According to various embodiments, after transmitting at least one item of the message-related information to the server, the electronic device receives the SMiShing-related information of corresponding message from the server through the communication unit 240 (425). The SMiShing-related information includes thumbnail information about a link, extracted using link information contained in the message, a message originator's SMiShing history extracted using the message originator's information, etc. The SMiShing history means the number of reports of SMiShing, matching a phone number or IM's ID of an originator, based on data registered in the server. When URL of a link contained in a message is reported as a malicious URL, the number of reports of the URL may also be used as a SMiShing history. The SMiShing-related information includes information about well-known companies or organizations that fraudsters have frequently used for fraud, e.g., delivery companies, financial organizations, etc. For example, the server stores, in the DB, official homepage address and official contacts of organizations or companies that fraudsters have frequently used for fraud. When message-related information including message body's content, originator's information, and link information is transmitted to the server, the SMiShing-related information transmitted from the server further includes official homepage addresses and official contacts corresponding to the names of companies or organizations contained in the message body. When a link or contact of a specific company (or organization) contained in a message don't match with the official homepage address and official contact registered in the server, the electronic device receives additional information notifying the user of a risk of SMiShing with respect to the message from the server.

The controller 250 determines whether the message on a list is selected to display the content (430). When the controller 250 ascertains that the message on a list is not selected in operation 430, it terminates the procedure. When the controller 250 ascertains that the message on a list is selected in operation 430, the controller 250 controls the SMiShing notification module 170 to display the selected message along with the SMiShing-related information (435). When the SMiShing-related information includes thumbnail information, the SMiShing notification module 170 displays the thumbnail information on a preview window in the message display screen. The SMiShing notification module 170 re-configures the form of displaying messages to display various items of SMiShing-related information on the message display window. When SMiShing-related information is displayed along with the message or a message display request is made before SMiShing-related information has been received, the SMiShing notification module 170 performs various added functions on the message display window. For example, when a message display request is made, the SMiShing notification module 170 performs an added function, e.g., displaying an alert passage, 'Don't select,' displaying part of a message display area in blinking, displaying a notification of a risk of SMiShing when a link is selected or an attempt is made to contact the originator, deactivating a function for calling a corresponding phone number, deactivating a function for selecting a link contained in the message, etc.

In the foregoing description, the method of notifying of SMiShing in an electronic device was described. In the following description, operations of a SMiShing detection server are explained in detail.

Figure 5:
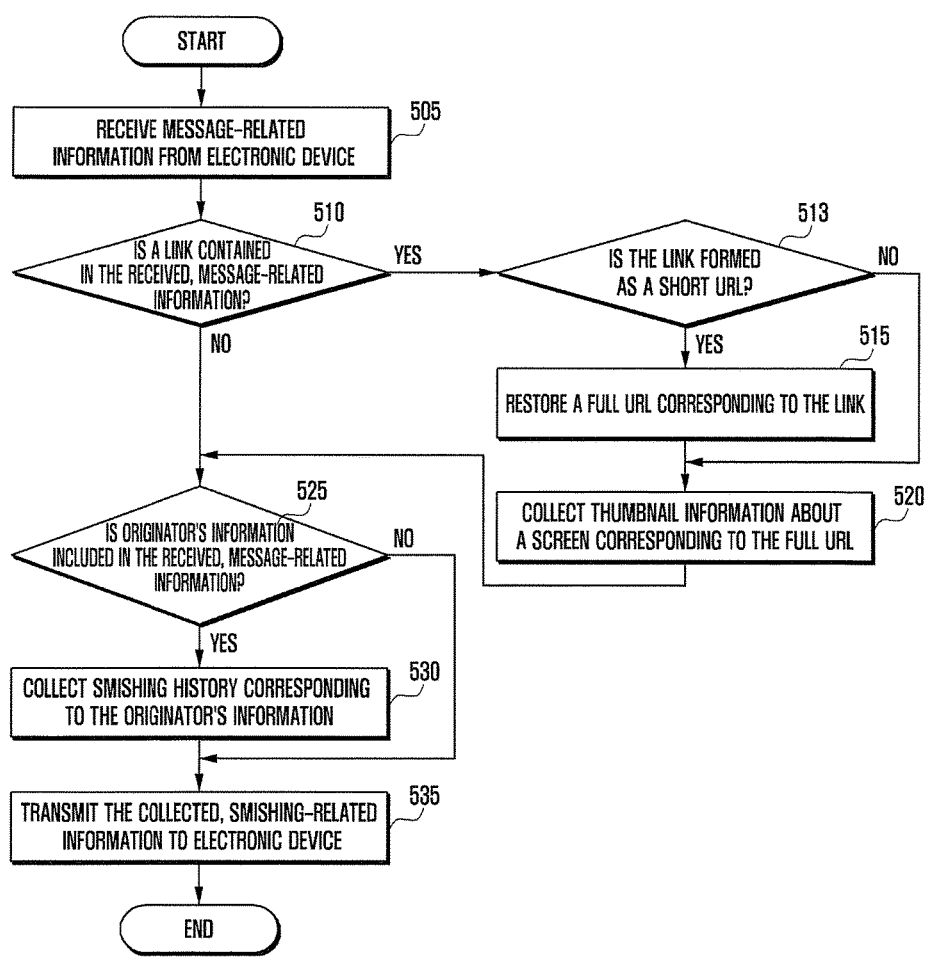
FIG. 5 illustrates a method of detecting SMiShing in a SMiShing detection server according to various embodiments of the present disclosure.

FIG. 5 is a flow chart that describes a method of detecting SMiShing in a SMiShing detection server according to various embodiments of the present disclosure. The server receives message-related information from the electronic device (505). The server determines whether the received, message-related information contains a link (510). For example, the link is expressed by using only a short URL without containing a correct address name for a website. When the server ascertains that the received, message-related information contains a link in operation 510, it determines whether the link is formed as a short URL (513). When the server ascertains that the link is formed as a short URL in operation 513, it restores a full URL corresponding to the link (515). In another embodiment, when the link is formed to be identical to the full URL, the server not performs operation 515. When the server extracts the full URL from the link as message-related information in operation 515, it collects thumbnail information about a screen corresponding to the full URL (520). The thumbnail is an image created by capturing a screen displayed when the restored, full URL is selected. More specifically, since the server makes an access to the URL in the received message instead of the electronic device, it can protect the electronic device against the risk (damage). Since the server uses an image capturing a result when it accessed the URL to display the access result on the screen of the electronic device, it can prevent malicious codes or commands related to the link from being transmitted to the electronic device and assists the electronic device user to detect whether the URL is consistent with the message information. When the server ascertains that the link is not formed as a short URL in operation 513, it performs operation 520.

After collecting the thumbnail information in operation 520 or when the server determines that the received message-related information is not include in the link in operation 510, the server determines whether the received, message-related information contains an originator's information (525). The originator's information includes the phone number, Instant Messenger's ID, etc. When the server ascertains that the received, message-related information contains an originator's information in operation 525, it collects SMiShing history corresponding to the originator's information (530). The SMiShing history is related to the number of reports of SMiShing, according to phone numbers or IM's IDs, stored in the server. For example, when the originator's information is a specific phone number, the server determines whether the phone number has been reported as SMiShing, and collects, when the phone number has been reported as SMiShing, the number of reports of SMiShing as a SMiShing history. The server transmits the collected, SMiShing-related information to the electronic device (535). The SMiShing-related information includes at least one of the following: the thumbnail information and the SMiShing history. When the server ascertains that the received, message-related information does not contain an originator's information in operation 525, it performs operation 535. The embodiment of FIG. 5 is described in such a way that the SMiShing-related information transmitted to the electronic device includes only the SMiShing history corresponding to an originator's information and the thumbnail information about a link contained in a message. It should, however, be understood that the SMiShing-related information according to various embodiments of the present disclosure is not limited to the embodiment. The server extracts SMiShing-related information, using message body content, message subject, etc. When the server transmits the collected, SMiShing-related information to the electronic device, the electronic device performs operations after operation 425 shown in FIG. 4.

FIGS. 6A to 6C and FIG. 7 are screens of displaying text messages along with SMiShing-related information according to various embodiments of the present disclosure.

Figure 6A:
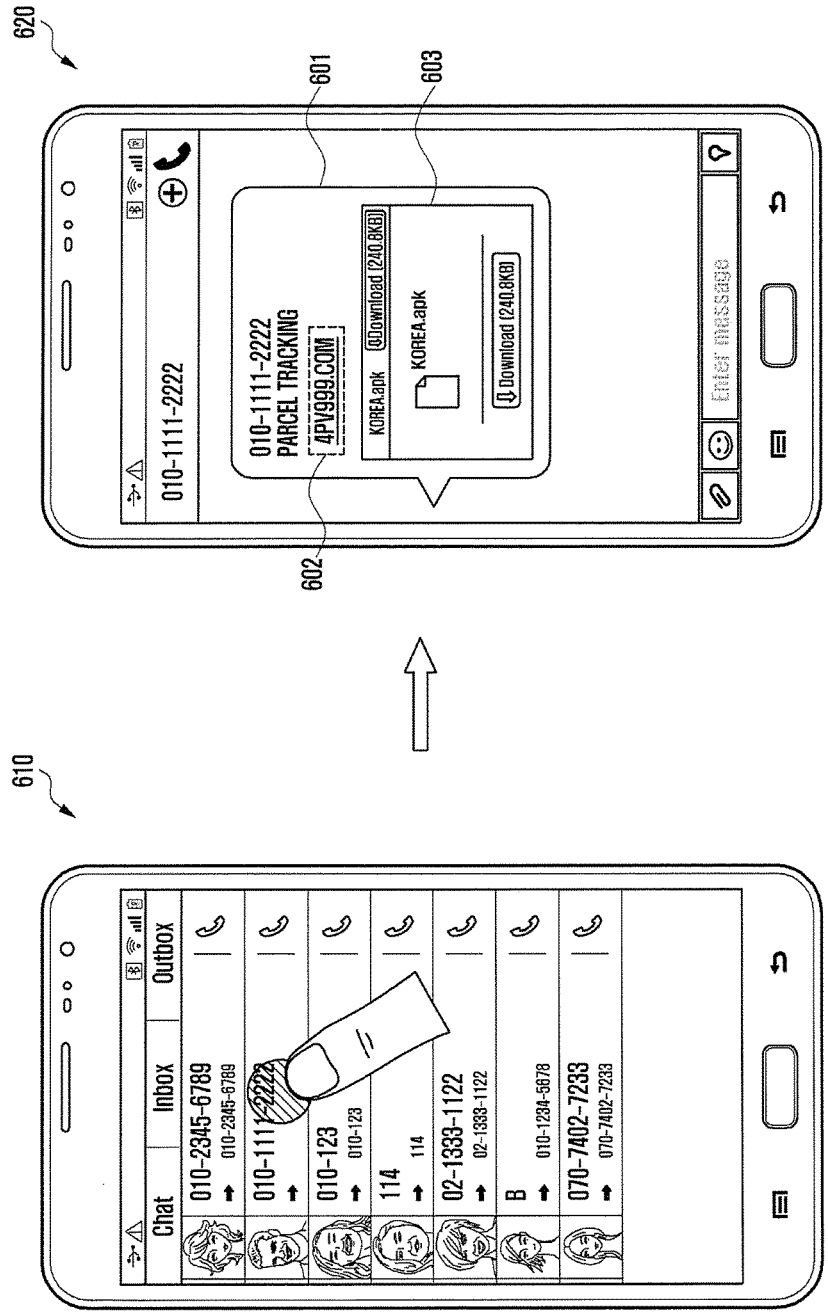
FIGS. 6A to 6C and FIG. 7 illustrate screens of displaying text messages along with SMiShing-related information according to various embodiments of the present disclosure.

FIGS. 6A to 6C and FIG. 7 shows screens related to operations 430 to 435 shown in FIG. 4. As shown in diagram 610 of FIG. 6A, an action for selecting a message is made on the message list. The selected message is displayed on the screen as shown in diagram 620 of FIG. 6A. and diagram 620 of FIG. 6A illustrates a message display window 601 displaying the message containing the message originator's phone number and a link 602. When the message contains the link 602, the electronic device receives the thumbnail information about a corresponding URL from the server and displays the message along with the received thumbnail information. The thumbnail information is displayed on a preview window 603 in the message display window 601. The user can recognize that the corresponding link includes content without regard to the received message, through the thumbnail information displayed on the preview window 603. More specifically, the message shown in diagram 620 is formed as if the link 602 is a link to a website for tracking parcels. However, the preview window 603 of the message shows a screen on which a file is being downloaded. Since the preview window 603 shows thumbnail information about a link, the user can determine whether the link is related to information consistent with the message.

Figure 6B:
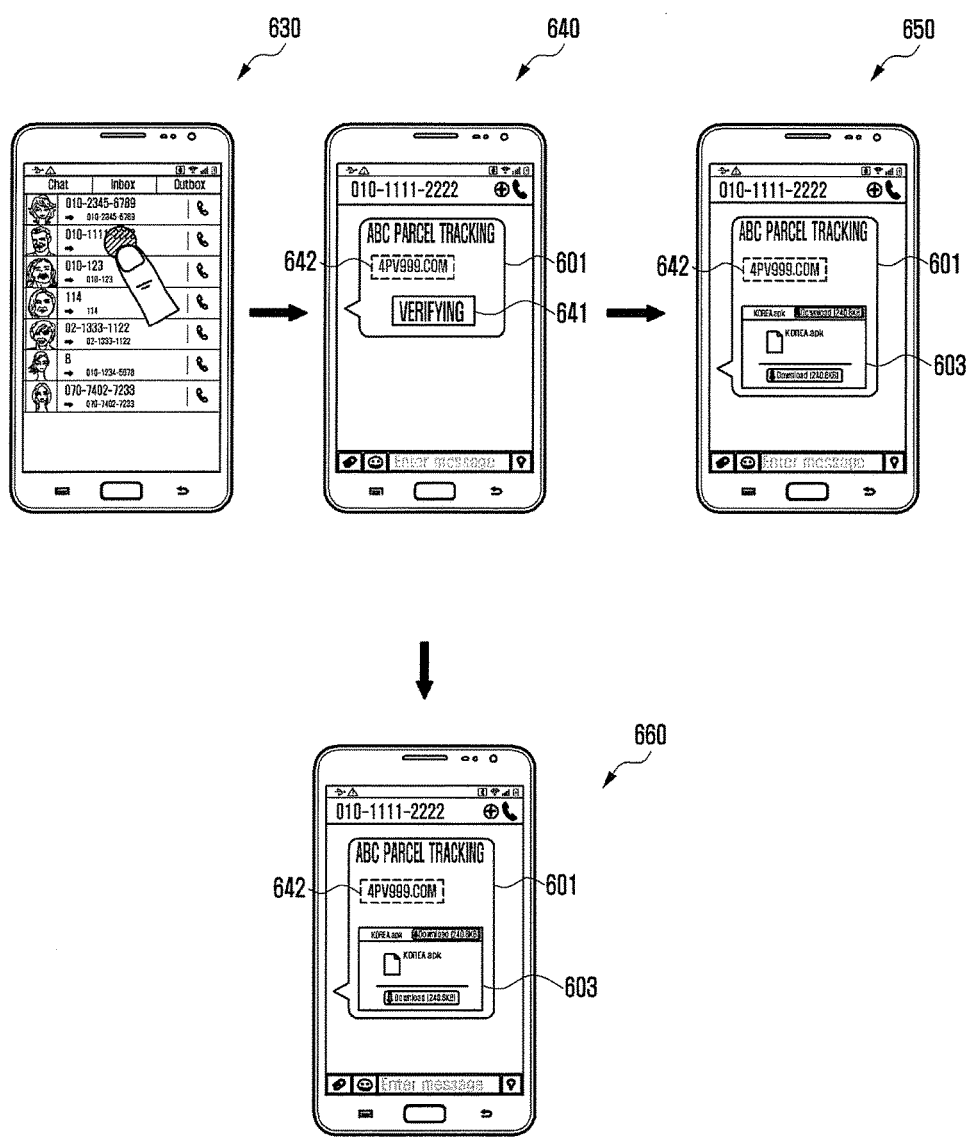

FIG. 6B illustrates a screen when a message display request is made before SMiShing-related information has been received from the server. As shown in diagram 630 of FIG. 6B, a specific message is selected on a message list. When the electronic device has not received the SMiShing-related information about the selected message, it displays a screen as shown in diagram 640 of FIG. 6B. Diagram 640 shows a notification passage 641 notifying that the message content and the SMiShing-related information has not been received on the message display window 601. The notification passage 641 is a passage, for example, 'Verifying.' According to various embodiments, when SMiShing-related information has not been received, a link 642 contained in the message display window 601 is displayed in a deactivated state so that the user cannot select it. Deactivating a link is performed to prevent an access to an authorized website. When SMiShing-related information has been received, a preview window 603 is displayed on the message display window 601 as shown in diagram 650 of FIG. 6B. The preview window 603 refers to an area in the message display window 610 displaying thumbnail information about a page corresponding to a link contained in the message. As described above, a link 642 in the message is displayed in a deactivated state. The link 642 is activated when the thumbnail information is displayed on the preview window 603 as shown in diagram 660 of FIG. 6B.

Figure 6C:
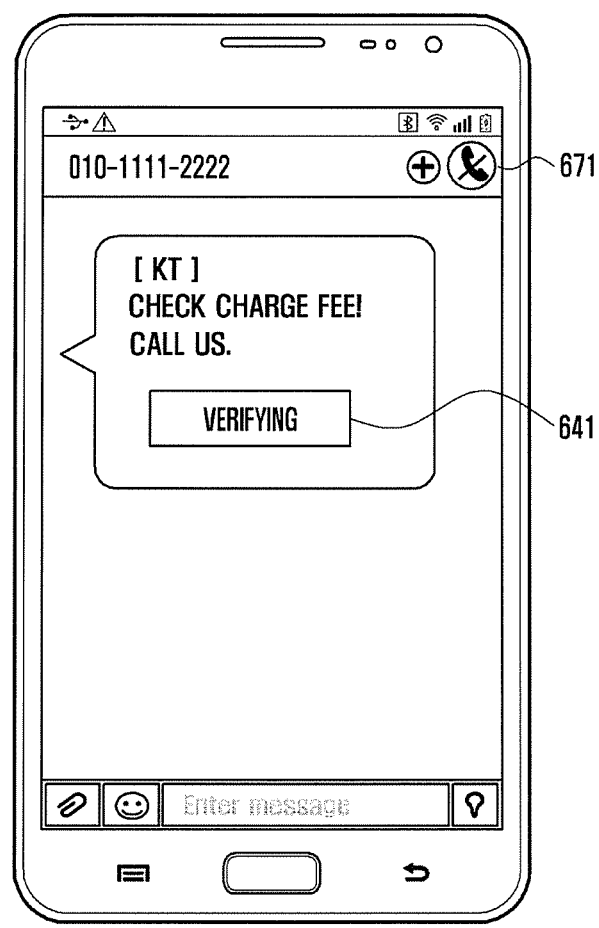

FIG. 6C illustrates a message screen before SMiShing-related information has been received, according to another embodiment. A SMiShing message directs the user into connecting to a link or making a call through a specific phone number, thereby causing damages to the user. In order to prevent the damages, various embodiments of the present disclosure can limit the call connection to an originator's phone number contained in a received message before the SMiShing-related information about the received message has been received. For example, as shown FIG. 6C, the embodiment can deactivate a call icon 671 so that the user cannot make a call to a corresponding phone number. When SMiShing-related information has not been received, for example, a passage 641, 'Verifying,' is being displayed, the embodiment can block making a call to the phone number contained in the received text message. The embodiment also displays, when the call icon 671 is selected, a pop-up window asking whether to make a call, along with a passage notifying that the verifying has not been completed.

Figure 7:
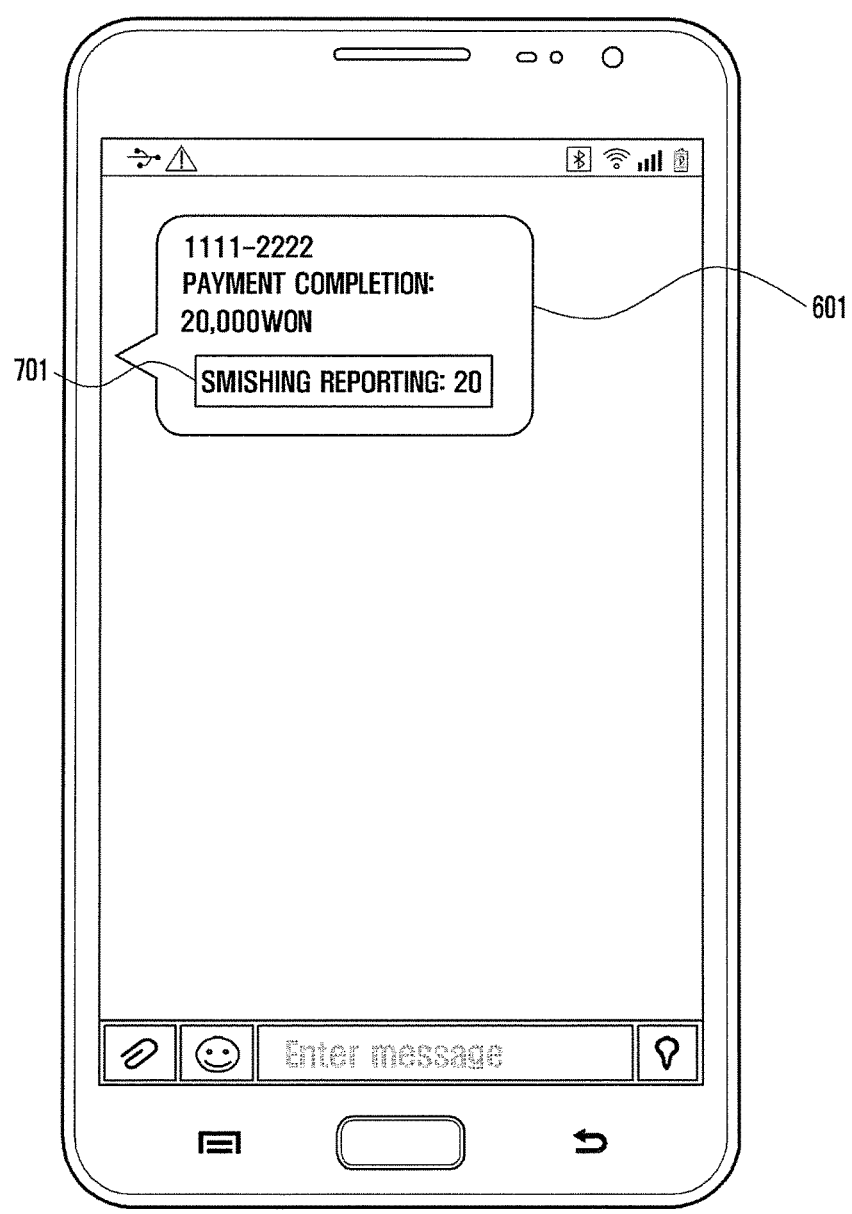

FIG. 7 illustrates a screen displaying a message along with a SMiShing history. As an example, SMiShing induces recipients to click a link in the received message, thereby causing damages to them, such as installing malicious software, revealing personal information, small-amount payment, etc. As another example, SMiShing fraudsters use the names of well-known companies or people as if they are legitimate entities, and direct recipients to make a call to a specific phone number, thereby causing damages to them. Although a message does not contain a link, the SMiShing detection server extracts the SMiShing-related information based on the message originator's information. When the SMiShing detection server transmits a SMiShing history extracted based on the originator's information to the electronic device, the electronic device displays the SMiShing history as shown in FIG. 7. FIG. 7 shows a screen displaying the body of a received message along with the number of reports of SMiShing 701, as a SMiShing history, on the message display window 601. As shown in FIG. 7, when a user receives a message of payment completion, he/she may have damage at the moment that he/she makes a call to the message originator's phone number to verify that he/she has never made a payment. Damage caused by the SMiShing technique that directs users to make a call to a specific phone number is reduced by a method of providing the SMiShing history 701 related to the phone number to the users. The SMiShing history 701, displayed on the message display window 601 along with the message, includes the number of reports of SMiShing damage, the number of reports of suspicious SMiShing, etc.

According to various embodiments of the present disclosure, a method of notifying of SMiShing by an electronic device includes: transmitting at least one item of message-related information about a received message to a server; receiving SMiShing-related information about the message from the server; and displaying content of the message and the received, SMiShing-related information when a request is made to display the message. In addition, according to various embodiments, a method of notifying of SMiShing by a server includes: receiving at least one item of message-related information from an electronic device; determining type of the received, message-related information; collecting SMiShing-related information notifying of whether a corresponding message is related to SMiShing, based on the determined, type of message-related information; and transmitting the collected, SMiShing-related information to the electronic device.

Figure 8:
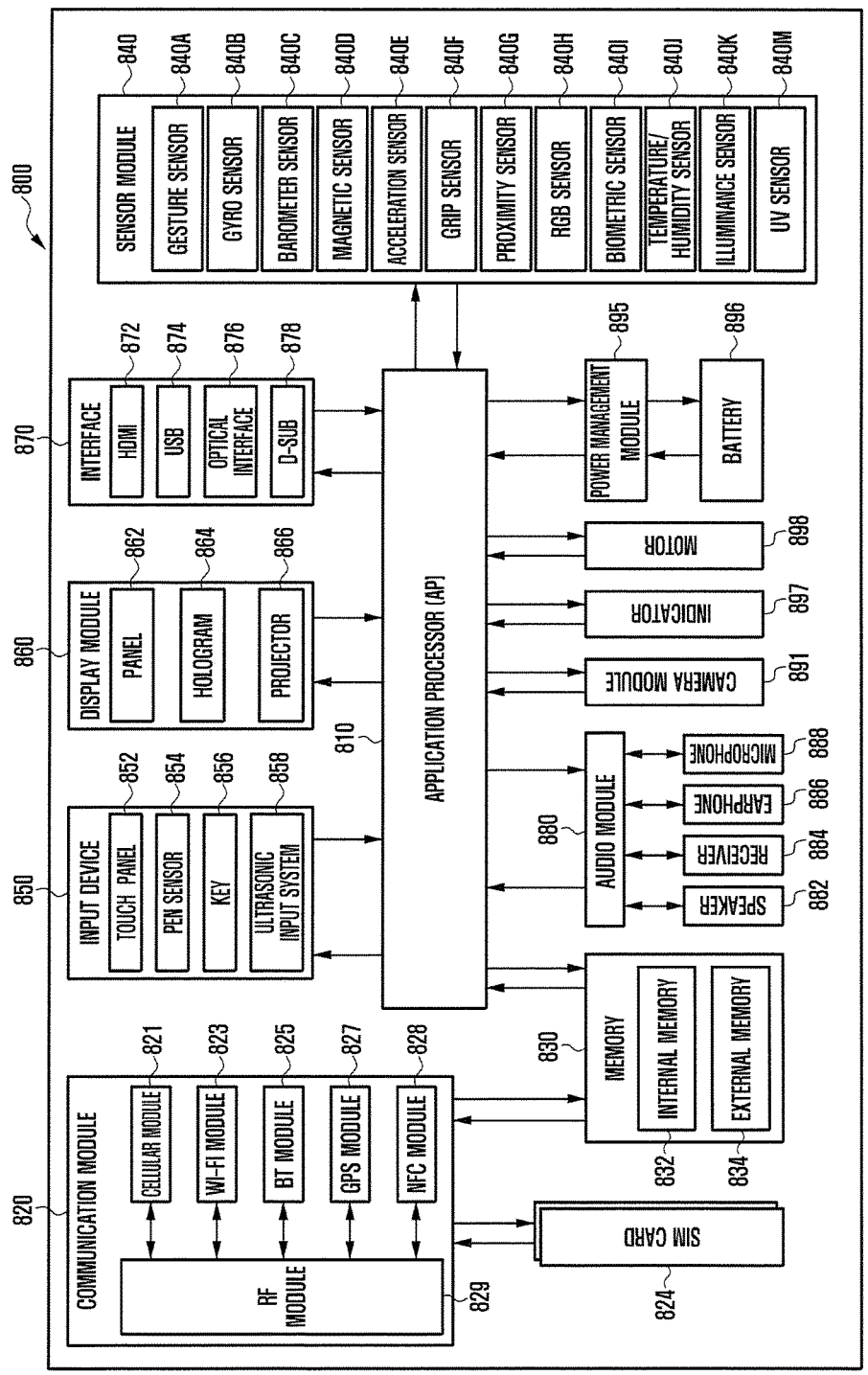
FIG. 8 illustrates an electronic device according to various embodiments of the present disclosure.

FIG. 8 is a block diagram illustrating a configuration of the electronic device according to various embodiments of the present disclosure. The electronic device 801 is of the whole or a part of the electronic device 101. Referring to FIG. 8, the electronic device 801 includes an Application Processor (AP) 810, a communication module 820, a Subscriber Identity Module (SIM) card 824, a memory 930, a sensor module 840, an input device 850, a display 860, an interface 870, an audio module 880, a camera module 891, a power management module 895, a battery 896, an indicator 897, and a motor 898.

The AP 810 operates an Operating System (OS) and/or application programs to control a plurality of hardware and/or software components connected to the AP 810 and perform data-processing and operations on multimedia data. For example, the AP 810 is implemented in the form of System on Chip (SoC). According to various embodiments, the AP 810 includes a Graphic Processing Unit (GPU) (not shown).

The communication module 820 (e.g. communication interface 160) perform data communication with other electronic devices (e.g. electronic device 104 and server 106) through a network. According to various embodiments, the communication module 820 includes a cellular module 821, a Wi-Fi module 823, a BT module 825, a GPS module 827, an NFC module 828, and a Radio Frequency (RF) module 829.

The cellular module 821 is responsible for voice and video communication, text messaging, and Internet access services through a communication network (e.g. LTE, LTE-A, CDMA, WCDMA, UMTS, WiBro, and GSM networks). The cellular module 821 performs identification and authentication of electronic devices in the communication network using the SIM card 824. According to various embodiments, the cellular module 821 performs at least one of the functions of the AP 810. For example, the cellular module 821 performs at least a part of the multimedia control function.

According to various embodiments, the cellular module 821 includes a Communication Processor (CP). The cellular module 821 is implemented in the form of SOC. Although the cellular module 821 (e.g. communication processor), the memory 830, and the power management module 895 are depicted as independent components separated from the AP 810, the present disclosure is not limited thereto but is embodied in a way that the AP includes at least one of the components (e.g. cellular module 821).

According to various embodiments, each of the AP 810 and the cellular module 821 (e.g. communication processor) loads a command or data received from at least one of the components on a non-volatile or volatile memory and processes the command or data. The AP 810 or the cellular module 821 stores the data received from other components or generated by at least one of other components in the non-volatile memory.

Each of the Wi-Fi module 823, the BT module 825, the GPS module 827, and the NFC module 828 includes a processor for processing the data it transmits/receives. Although the cellular module 821, the Wi-Fi module 823, the BT module 825, the GPS module 827, and the NFC module 828 are depicted as independent blocks; at least two of them (e.g. communication processor corresponding to the cellular module 821 and Wi-Fi processor corresponding to the Wi-Fi module 823) are integrated in the form of SoC.

The RF module 829 is responsible for data communication, e.g. transmitting or receiving RF signals. Although not depicted, the RF module 829 includes a transceiver, a Power Amp Module (PAM), a frequency filter, and a Low Noise Amplifier (LNA). The RF module 829 also includes the elements for transmitting or receiving electric wave in free space, e.g. conductor or conductive wire. Although FIG. 8 is directed to the case where the Wi-Fi module 823, the BT module 825, the GPS module 827, and the NFC module 828 are sharing the RF module 829, the present disclosure is not limited thereto but is embodied in a way that at least one of the Wi-Fi module 823, the BT module 825, the GPS module 827, and the NFC module 828 transmits or receives RF signals an independent RF module.

The SIM card 824 is designed so as to be inserted into a slot formed at a predetermined position of the electronic device. The SIM card 824 stores unique identity information (e.g. Integrated Circuit Card Identifier (ICCID)) or subscriber information (e.g. International Mobile Subscriber Identity (IMSI)).

The memory 830 (e.g. memory 130) includes at least one of the internal memory 832 and an external memory 834. The internal memory 832 includes at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to various embodiments, the internal memory 832 is a Solid State Drive (SSD). The external memory 834 is a flash drive such as Compact Flash (CF), Secure Digital (SD), micro-SD, Mini-SD, extreme Digital (xD), and Memory Stick. The external memory 834 is connected to the electronic device 801 through various interfaces functionally. According to various embodiments, the electronic device 801 includes a storage device (or storage medium) such as hard drive.

The sensor module 840 measures physical quantity or check the operation status of the electronic device 801 and convert the measured or checked information to an electric signal. The sensor module 840 includes at least one of gesture sensor 840A, Gyro sensor 840B, atmospheric pressure sensor 840C, magnetic sensor 840D, acceleration sensor 840E, grip sensor 840F, proximity sensor 840G, color sensor 840H (e.g. Red, Green, Blue (RGB) sensor), bio sensor 840I, temperature/humidity sensor 840J, illuminance sensor 840K, and Ultra Violet (UV) sensor 840M. The sensor module 840 includes E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), and fingerprint sensor (not shown). The sensor module 840 further includes a control circuit for controlling at least one of the sensors included therein.

The input device 850 includes a touch panel 852, a (digital) pen sensor 854, keys 856, and an ultrasonic input device 858. The touch panel 852 is one of capacitive, resistive, infrared, microwave type touch panel. The touch panel 852 includes a control circuit. In the case of the capacitive type touch panel, it is possible to detect physical contact or approximation. The touch panel 852 further includes a tactile layer. In certain embodiments, the touch panel 852 provides the user with haptic reaction.

The (digital) pen sensor 854 is implemented with a sheet with the same or similar way as touch input of the user or a separate recognition sheet. The keys 856 include physical buttons, optical key, and keypad. The ultrasonic input device 858 is a device capable of checking data by detecting sound wave through a microphone 888 and is implemented for wireless recognition. According to various embodiments, the electronic device 801 receives the user input made by means of an external device (e.g. computer or server) connected through the communication module 820.

The display 860 (e.g. display module 150) includes a panel 862, a hologram device 864, and a projector 866. The panel 862 is a Liquid Crystal Display (LCD) panel or an Active Matrix Organic Light Emitting Diodes (AMOLED) panel. The panel 862 is implemented so as to be flexible, transparent, and/or wearable. The panel 862 is implemented as a module integrated with the touch panel 852. The hologram device 864 presents a 3-dimensional image in the air using interference of light. The projector 866 project an image to a screen. The screen is placed inside or outside the electronic device. According to various embodiments, the display 860 includes a control circuit for controlling the panel 862, the hologram device 864, and the projector 866.

The interface 870 includes a High-Definition Multimedia Interface (HDMI) 872, a Universal Serial Bus (USB) 874, an optical interface 876, and a D-subminiature (D-sub) 878. The interface 870 includes the communication interface 160 as shown in FIG. 1. The interface 870 includes a Mobile High-definition Link (MHL) interface, a SD/MMC card interface, and infrared Data Association (irDA) standard interface.

The audio module 880 converts sound to electric signal and vice versa. At least a part of the audio module 880 is included in the input/output interface 140 as shown in FIG. 1. The audio module 880 processes the audio information input or output through the speaker 882, the receiver 884, the earphone 886, and the microphone 888.

The camera module 891 is a device capable of taking still and motion pictures and, according to various embodiments, includes at least one image sensor (e.g. front and rear sensors), a lens (not shown), and Image Signal Processor (ISP) (not shown), and a flash (e.g. LED or xenon lamp) (not shown).

The power management module 895 manages the power of the electronic device 801. Although not shown, the power management module 895 includes a Power Management Integrated Circuit (PMIC), a charger Integrated Circuit (IC), a battery, and a battery or fuel gauge.

The PMIC is integrated into an integrated circuit or SoC semiconductor. The charging is classified into wireless charging and wired charge. The charger IC charges the battery and protects the charger against overvoltage or overcurrent. According to various embodiments, the charger IC includes at least one of wired charger and wireless charger ICs. Examples of the wireless charging technology includes resonance wireless charging and electromagnetic wave wireless charging, and there is a need of extra circuit for wireless charging such as coil loop, resonance circuit, and diode.

The battery gauge measures the residual power of the battery 896, charging voltage, current, and temperature. The battery 896 stores or generates power and supplies the stored or generated power to the electronic device 801. The battery 896 includes a rechargeable battery or a solar battery.

The indicator 897 displays operation status of the electronic device 801 or a part of the electronic device, booting status, messaging status, and charging status. The motor 898 converts the electronic signal to mechanical vibration. Although not shown, the electronic device 801 includes a processing unit (e.g. GPU) for supporting mobile TV. The processing unit for supporting the mobile TV is able to processing the media data abiding by the broadcast standards such Digital Multimedia Broadcasting (DMB), Digital Video Broadcasting (DVB), and media flow.

As described above, the text display method and apparatus of an electronic device of the present disclosure is advantageous in terms of reducing a number of page scrolls by discerning the paragraphs included in a text document and folding the paragraphs to present parts of the respective paragraphs.

Also, the text display method and apparatus of an electronic device of the present disclosure is advantageous in terms of improving the legibility of the text in such a way of enlarging, when a folded paragraph is stretched, the font size of the paragraph or highlighting the paragraph.

The above enumerated components of the electronic device of the present disclosure may be implemented into one or more parts, and the names of the corresponding components may be changed depending on the kind of the electronic device. The electronic device of the present disclosure includes at least one of the aforementioned components with omission or addition of some components. The components of the electronic device of the present disclosure may be combined selectively into an entity to perform the functions of the components equally as before the combination.

The term "module" according to the embodiments of the disclosure, means, but is not limited to, a unit of one of software, hardware, and firmware or any combination thereof. The term "module" is used interchangeably with the terms "unit," "logic," "logical block," "component," or "circuit." The term "module" denotes a smallest unit of component or a part thereof. The term "module" is the smallest unit of performing at least one function or a part thereof. A module is implemented mechanically or electronically. For example, a module include at least one of Application-Specific Integrated Circuit (ASIC) chip, Field-Programmable Gate Arrays (FPGAs), and Programmable-Logic Device known or to be developed for certain operations.

According to various embodiments of the present disclosure, the devices (e.g. modules or their functions) or methods are implemented by computer program instructions stored in a computer-readable storage medium. In the case that the instructions are executed by at least one processor (e.g. processor 120), the at least one processor executes the functions corresponding to the instructions. The computer-readable storage medium is the memory 130. At least a part of the programming module is implemented (e.g. executed) by the processor 120. At least part of the programming module includes modules, programs, routines, sets of instructions, and processes for executing the at least one function.

The module or programming module of the present disclosure includes at least one of the aforementioned components with omission of some components or addition of other components. The operations of the modules, programming modules, or other components is executed in series, in parallel, recursively, or heuristically. Also, some operations are executed in different order, omitted, or extended with other operations.

According to various embodiments, a storage medium stores instructions. When the instructions are executed by at least one processor, the instructions execute at least one process. The process includes: transmitting, when a message has been received, at least one item of message-related information about the received message to a SMiShing detection server; receiving SMiShing-related information about the message from the SMiShing detection server; and displaying content of the message and the received, SMiShing-related information when a request is made to display the message.

As described above, the method and apparatus of notifying of SMiShing according to embodiments of the present disclosure can receive SMiShing-related information (e.g., SMiShing history, a thumbnail of a page of URL, etc.) about received text messages from a SMiShing detection server that manages details of originators and fraudulent URLs, and can display the received message along with the SMiShing-related information. Therefore, the user can intuitively recognize whether the received message is a SMiShing message.

Although exemplary embodiments of the disclosure have been described in detail above, it should be understood that many variations and modifications of the basic inventive concept herein described, which may be apparent to those skilled in the art, will still fall within the spirit and scope of the exemplary embodiments of the disclosure as defined in the appended claims.

What is claimed is:

1. A method of notifying of SMiShing by an electronic device comprising:
    receiving a message from a sender;
    transmitting a request signal for SMiShing-related information about the message to a SMiShing detection server, the request signal including message-related information about the received message;
    deactivating a function for calling a sender corresponding to the message if the SMiShing-related information about the message is not received;
    receiving the SMiShing-related information about the message from the SMiShing detection server; and
    subsequent to receiving the SMiShing-related information about the message, displaying content of the message and the received SMiShing-related information about the message, in response to a request to display the message,
    wherein the SMiShing-related information about the message comprises a SMiShing history corresponding to the sender, the SMiShing history comprising information about a number of SMiShing attempts from the sender,
    wherein the request signal is transmitted in response to determining that information of the sender corresponding to the message is not stored in the electronic device.

2. The method of claim 1, wherein transmitting the request signal comprises:
    determining whether the received message corresponds to a target for SMiShing detection; and
    extracting the message-related information from the message when the received message corresponds to a target for SMiShing detection.

3. The method of claim 1, wherein the message-related information comprises:
    a sender's information of the message, a subject of the message, a body content of the message, and a link contained in the message.

4. The method of claim 3, wherein the SMiShing-related information about the message comprises:
    thumbnail information about a page corresponding to the link.

5. The method of claim 1, further comprising at least one of the following:
    displaying an alert message related to SMiShing; and
    displaying part of a message display area as blinking when a request is made to display the message before the SMiShing-related information about the message has been received.

6. A method of notifying of SMiShing comprising:
    receiving, by an electronic device, a message;
    transmitting, from the electronic device, a request signal for SMiShing-related information about the message to a SMiShing detection server, the request signal including message-related information about the message;
    collecting, by the SMiShing detection server, the SMiShing-related information about the message;
    deactivating, by the electronic device, a function for calling a sender corresponding to the message if the SMiShing-related information about the message is not received;
    transmitting the collected SMiShing-related information about the message from the SMiShing detection server to the electronic device; and displaying, by the electronic device, in response to a request to display the message, content of the message and the collected SMiShing-related information about the message, wherein the SMiShing-related information about the message includes a thumbnail corresponding to at least one link included in the message, wherein the SMiShing-related information about the message includes SMiShing history information of the sender corresponding to the message, the SMiShing history information comprising information about a number of SMiShing attempts from the sender, and wherein the request signal is transmitted in response to determining that information of the sender corresponding to the message is not stored in the electronic device.

7. An electronic device for notifying of SMiShing comprising:

a transceiver configured to:
  receive a message from a sender;
  transmit a request signal for SMiShing-related information about the message to a SMiShing detection server, the request signal including message-related information; and
  receive SMiShing-related information about the message from the SMiShing detection server;

a display; and a processor configured to:
  determine whether information about a sender corresponding to the message is stored in the electronic device
  control the transceiver to transmit the request signal in response to determining that information about the sender corresponding to the message is not stored in the electronic device;
  deactivate a function for calling the sender corresponding to the message if the SMiShing-related information about the message is not received;
  determine a type of the message-related information to include in the request signal; and
  control the display to display content of the received message and the received SMiShing-related information about the message in response to a request to display the message, wherein the SMiShing-related information about the message comprises a SMiShing history corresponding to the sender, the SMiShing history comprising information about a number of SMiShing attempts from the sender, wherein the request signal is transmitted in response to determining that information of the sender corresponding to the message is not stored in the electronic device.

8. The electronic device of claim 7, wherein the processor is further configured to:
  determine whether the received message corresponds to a target for SMiShing detection; and
  extract the message-related information from the message determined as a target for SMiShing detection.

9. The electronic device of claim 7, wherein the message-related information comprises:
  a sender's information of the message, a subject of the message, a body content of the message, and a link contained in the message.

10. The electronic device of claim 9, wherein the SMiShing-related information comprises:
  thumbnail information about a page corresponding to the link.

11. The electronic device of claim 7, wherein the processor is further configured to:
  provide a SMiShing notification module to perform, in response to a request to display the message before the SMiShing-related information about the message has been received, at least one of: display an alert message related to SMiShing; and display part of a message display area as blinking.

* * * * *